United States Patent
Vasseur et al.

(10) Patent No.: US 9,614,770 B2
(45) Date of Patent: Apr. 4, 2017

(54) NETWORK TRAFFIC CONTROL DURING LIMITED POWER SITUATIONS

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US)

(73) Assignee: Cisco Technology, Inc., San Jose, CA (US)

(*) Notice: Subject to any disclaimer, the term of this patent is extended or adjusted under 35 U.S.C. 154(b) by 192 days.

(21) Appl. No.: 14/576,697

(22) Filed: Dec. 19, 2014

(65) Prior Publication Data

US 2016/0021013 A1    Jan. 21, 2016

Related U.S. Application Data

(60) Provisional application No. 62/026,965, filed on Jul. 21, 2014.

(51) Int. Cl.
| | |
|---|---|
| *H04L 12/26* | (2006.01) |
| *H04L 12/815* | (2013.01) |
| *H04L 12/813* | (2013.01) |
| *H04L 12/801* | (2013.01) |
| *H04W 40/10* | (2009.01) |

(52) U.S. Cl.
CPC .............. *H04L 47/22* (2013.01); *H04L 47/18* (2013.01); *H04L 47/20* (2013.01); *H04W 40/10* (2013.01)

(58) Field of Classification Search
CPC ......... H04L 47/18; H04L 47/20; H04L 47/22; H04W 40/10
USPC ................... 370/241–253, 217–237
See application file for complete search history.

(56) References Cited

U.S. PATENT DOCUMENTS

| | | | | |
|---|---|---|---|---|
| 2005/0102384 A1* | 5/2005 | Ueno | ................... | H04L 12/2803 709/223 |
| 2008/0068217 A1* | 3/2008 | Van Wyk | ............... | G01D 4/004 340/870.11 |
| 2010/0061272 A1* | 3/2010 | Veillette | .................. | H04L 45/34 370/254 |
| 2012/0178464 A1* | 7/2012 | Li | .......................... | H04W 72/02 455/450 |
| 2013/0077478 A1* | 3/2013 | Matsuura | ................ | H04L 45/22 370/225 |

* cited by examiner

*Primary Examiner* — Thai Hoang
(74) *Attorney, Agent, or Firm* — Parker Ibrahim & Berg LLC; James M. Behmke; Stephen D. LeBarron

(57) ABSTRACT

In one embodiment, a device in a network detects a power outage event. The device monitors one or more operational properties of the device, in response to detecting the power outage event. The device determines whether to initiate a traffic control mechanism based on the one or more monitored operational properties of the device, according to a power outage traffic control policy. The device causes one or more nodes in the network that send traffic to the device to regulate the traffic sent to the device, in response to a determination that the traffic control mechanism should be initiated.

22 Claims, 14 Drawing Sheets

NETWORK TRAFFIC CONTROL DURING LIMITED POWER SITUATIONS

RELATED APPLICATIONS

This application claims priority to U.S. Provisional Application No. 62/026,965, filed Jul. 21, 2014, entitled: "NETWORK TRAFFIC CONTROL DURING LIMITED POWER SITUATIONS," by Vasseur et al., the contents of which are herein incorporated by reference.

TECHNICAL FIELD

The present disclosure relates generally to computer networks, and, more particularly, to network traffic control during limited power situations.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
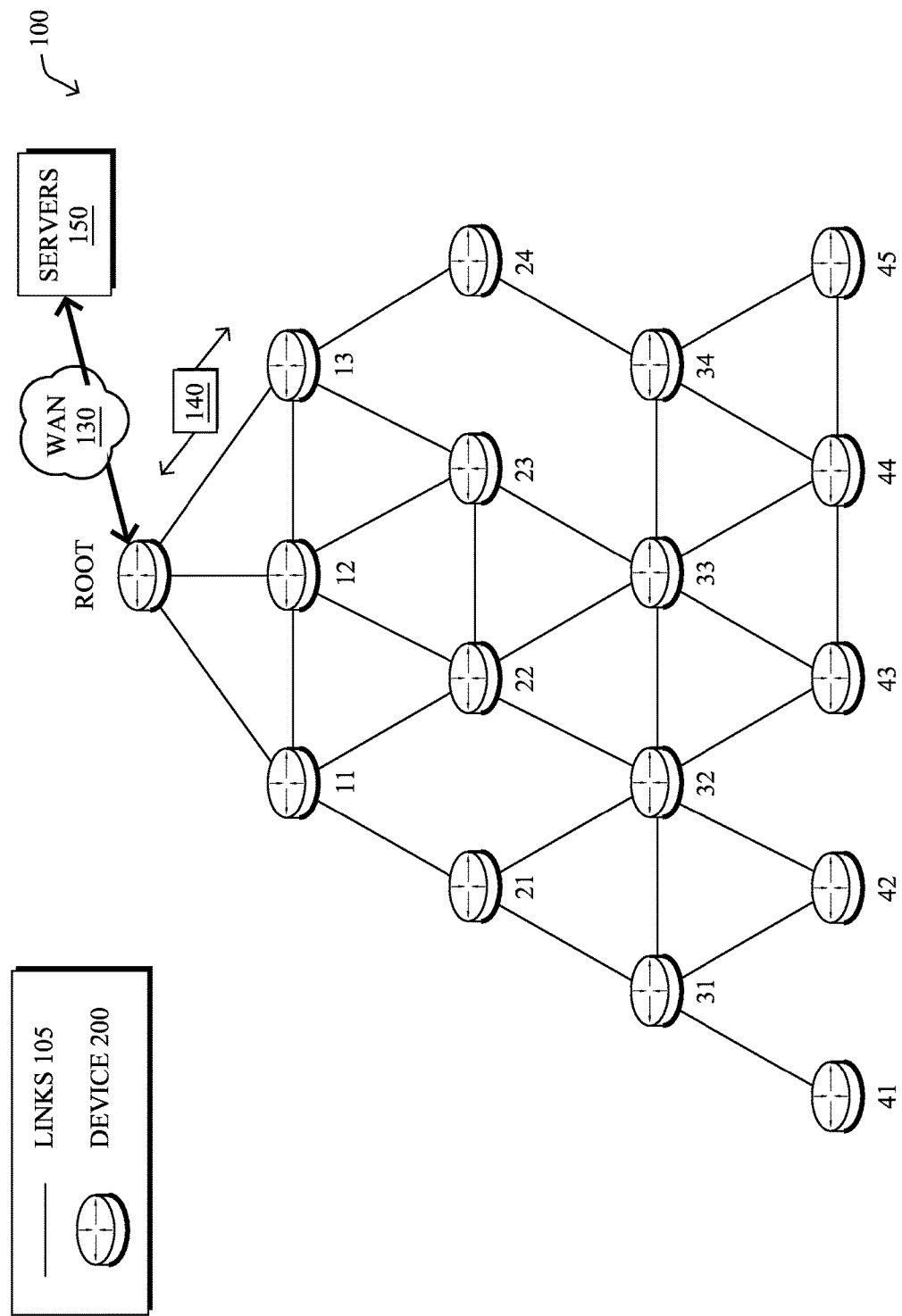
FIG. 1 illustrates an example communication network.

According to one or more embodiments of the disclosure, a device in a network detects a power outage event. The device monitors one or more operational properties of the device, in response to detecting the power outage event. The device determines whether to initiate a traffic control mechanism based on the one or more monitored operational properties of the device, according to a power outage traffic control policy. The device causes one or more nodes in the network that send traffic to the device to regulate the traffic sent to the device, in response to a determination that the traffic control mechanism should be initiated.

In further embodiments, a first device in a network sends traffic towards a second device along a routing path in the network while the second device is experiencing a power outage event. The first device receives a request from the second device to regulate the traffic sent to the second device during the power outage event, according to a power outage traffic control policy. The first device performs a power outage traffic control action, in response to receiving the request from the second device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
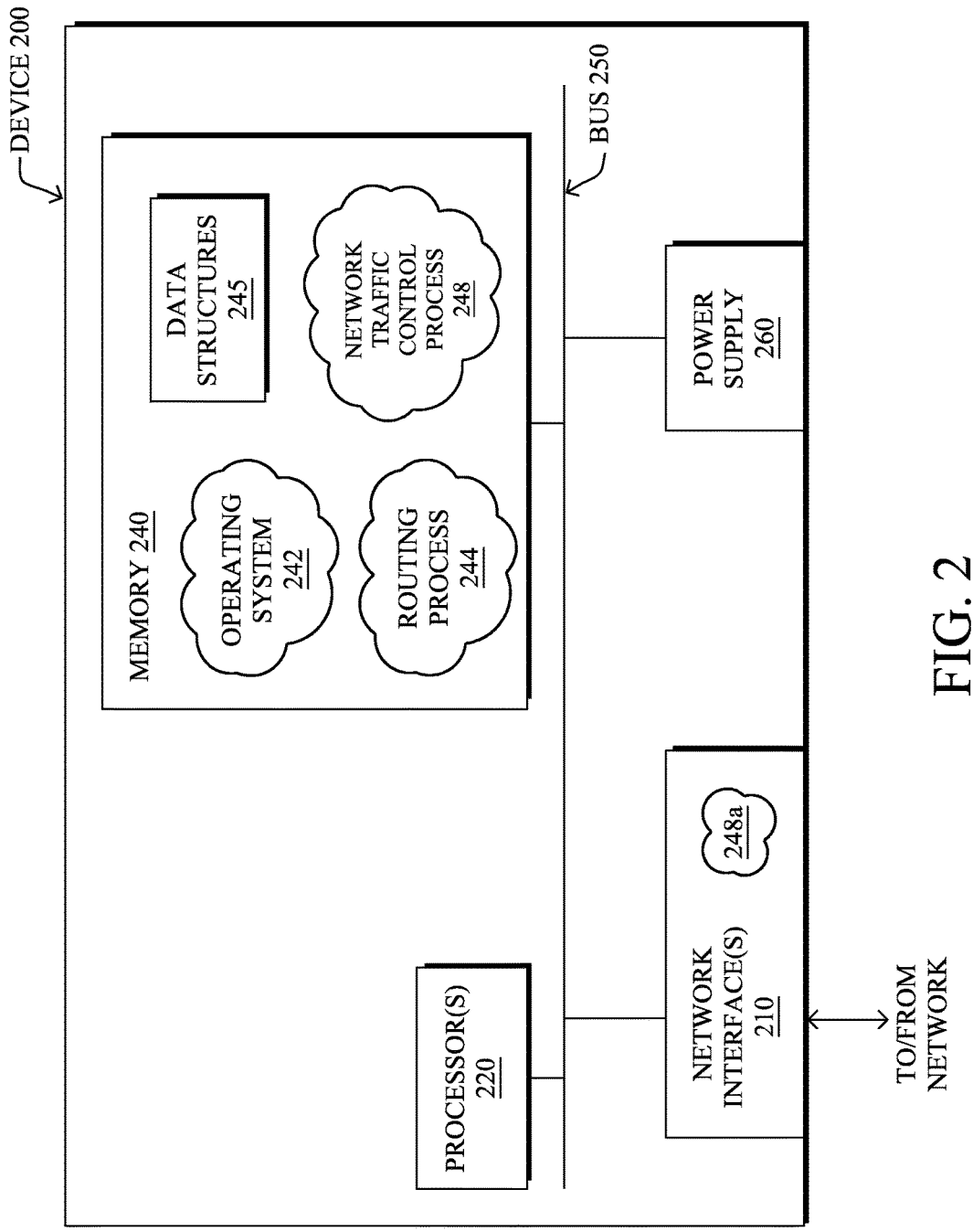
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.). In some cases, power supply 260 may supply power from a primary power source (e.g., a power line) or, in case of failure of the primary power source, from a secondary power source (e.g., a battery, an ultra-capacitor, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "network traffic control" process 248, which may be configured depending upon the particular node/device within the network 100 with functionality ranging from intelligent learning machine processes to merely communicating with intelligent learning machines, as described herein. Note also that while the network traffic control process 248 is shown in centralized memory 240, alternative embodiments provide for the process to be specifically operated within the network interfaces 210 (e.g., "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
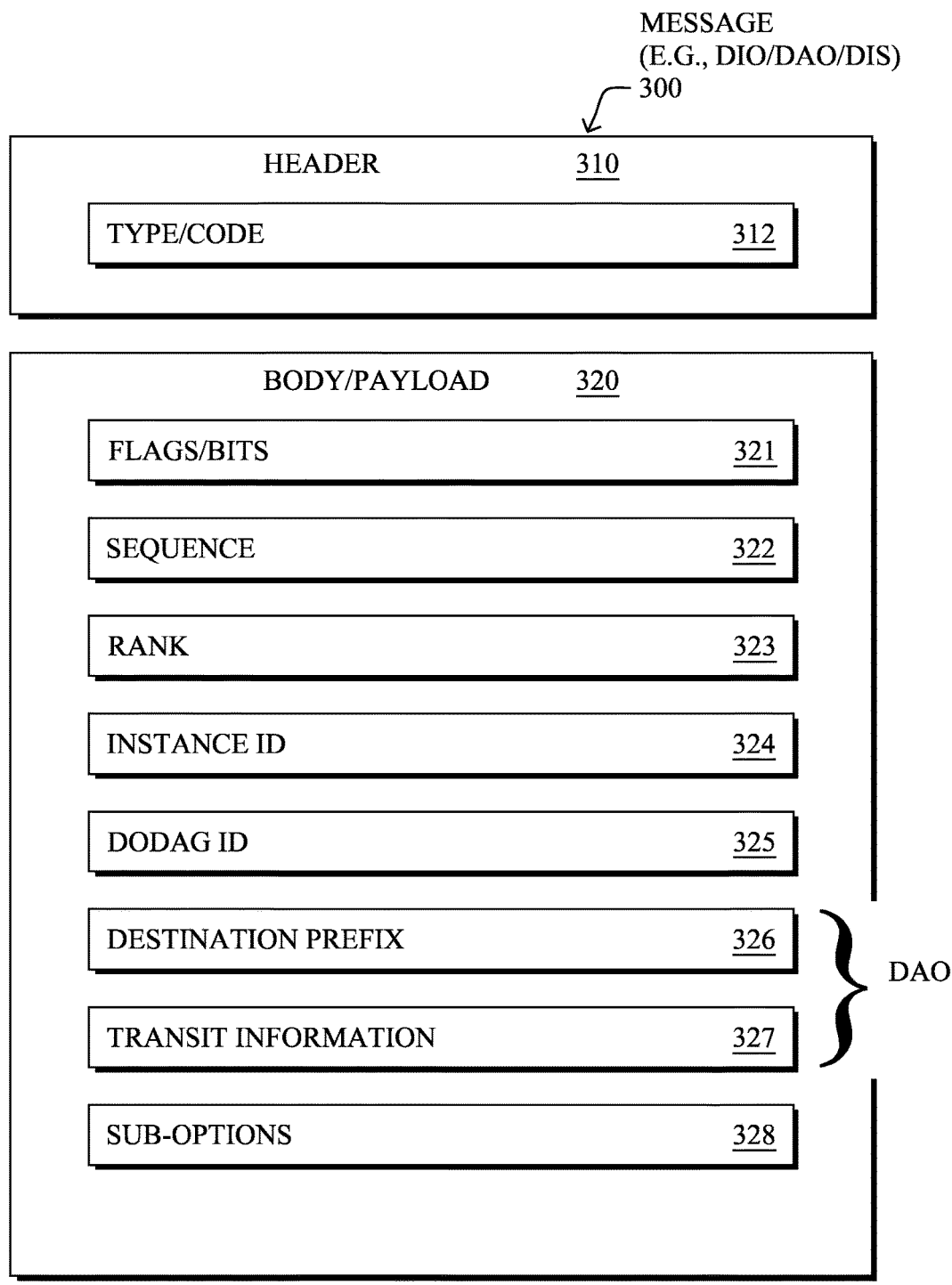
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
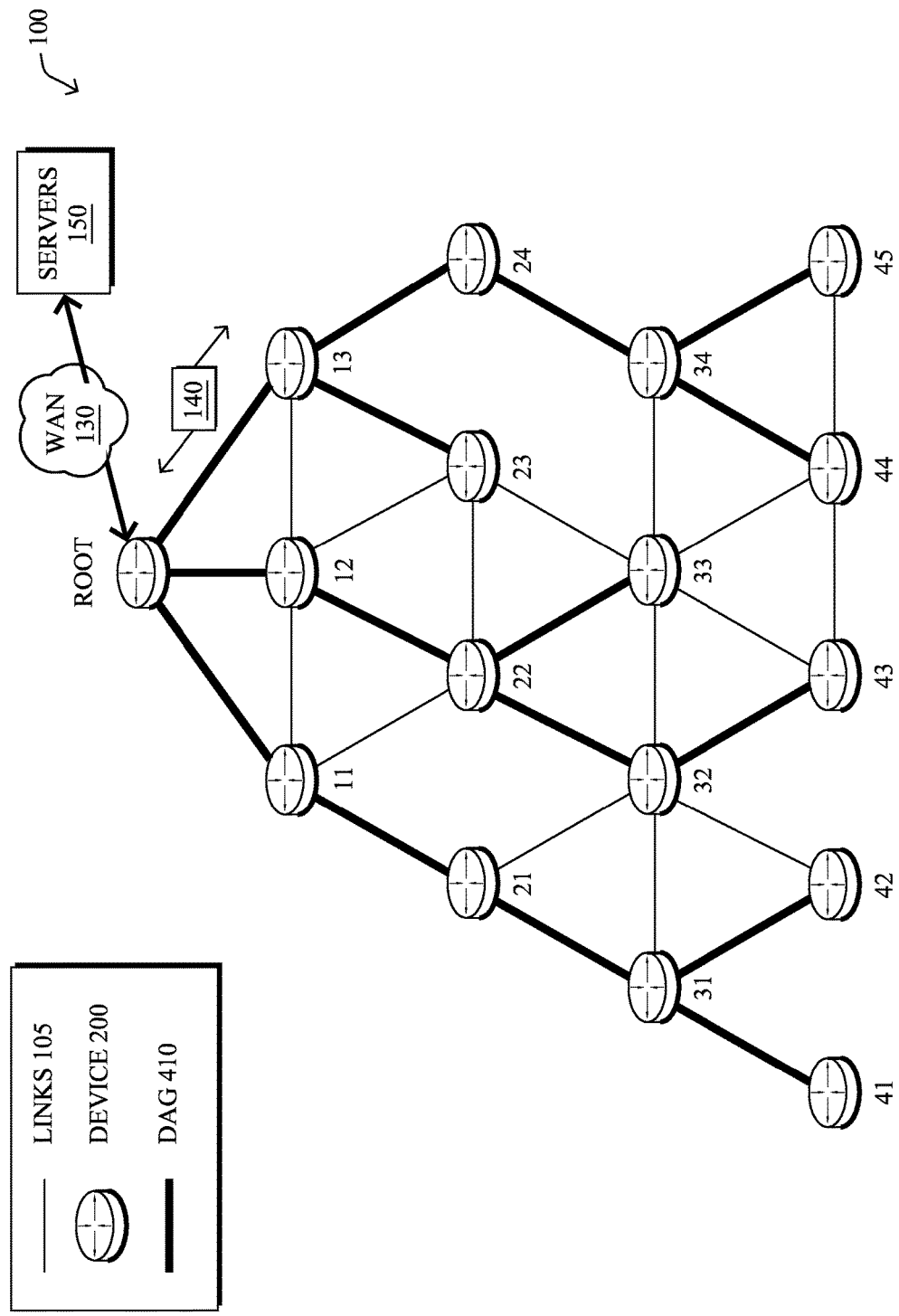
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, IoT networks such as Smart Grid AMI deployments may utilize a number of different link technologies, including wireless/radio frequency (RF), PLC, and/or cellular. Each link technology provides its own set of strengths and weaknesses. However, a common recurring characteristic in many deployments is that a single link technology is generally only capable of reaching 95-98% of the devices. An alternative approach is to have IoT networks (or LLNs in general) support multiple link technologies simultaneously, such as RF and PLC. Notably, a multi-PHY solution opens the door to addressing numerous technical issues and making a number of technology improvements. Furthermore, while a multi-PHY solution increases the overall device cost, significant cost savings are made by minimizing service calls needed when a single-PHY solution fails.

A multi-PHY solution offers a device a number of methods to communicate packets to neighboring devices. A common method to achieve robustness is through diversity. However, diversity can be achieved in a number of domains. For example, diversity in the time domain may be achieved through backoffs and retransmissions. Diversity in the frequency domain may be achieved by transmitting on different frequencies. Diversity in the spatial domain may be achieved by transmitting to different neighbors. Diversity in the media domain may be achieved by transmitting on different physical media (e.g. RF vs. PLC). These various forms of diversity can allow for reliable packet communication on top of an unreliable communication medium. However, those forms of diversity can offer vastly different latency characteristics. For example, retransmission using backoffs incurs significantly more latency than simultaneously transmitting the same packet across two different forms of physical media.

Furthermore, although most large scale IoT networks have been deployed in the context of Smart Grid application AMI (e.g., the largest AMI networks currently comprise two million nodes), there is strong demand for using such networks as multi-service networks carrying different types of traffic (e.g., real time and non-real time). To that end, new devices have been designed in order to carry non-IP IoT traffic from serial interfaces using tunnel-based techniques over LLN meshes. Such networks (IoT mesh) may then comprise routing devices such as advanced meters, range extenders, and also DA (Distributed Automation) gateways with and without backup battery units (BBUs).

In other words, although such networks were originally deployed for one type of traffic (e.g., Smart Meters), generating one type of traffic (Advanced Metering), and using one link type (e.g., IEEE 802.15.4), they are very quickly moving towards heterogeneous meshes with a variety of links (e.g., RF and PLC) and node types (e.g., meters, gateways, with or without BBU, etc.) carrying a variety of traffic (real time and non real-time). To that end, two types of meshes tend to emerge: 1.) Single Multi-Service Mesh (SMM) or 2.) Dual Mesh (DM) where, for example, each mesh carries a different type of traffic. According, some meshes may include heterogeneous devices such as main-powered meters, range extenders, and DA-gateways with or without BBUs.

In contrast with "classic" IP networks, IoT networks have the following unique characteristic: upon power failure, devices may start failing at different rates, thus leading to a series of DAGs, each with a different lifetime and get progressively sparser in terms of connectivity and, consequently, network capacity. For example, nodes such as smart meters may have a lifetime of around 30 seconds after power failure, whereas gateways or range extenders with BBUs may last for several hours after power failure. Thus, unless power is restored, the DAG may progressively be reduced until the DAG only includes those nodes that did not experience the power failure. However, current routing techniques in both classic and IoT networks do not take into account the progressive deterioration of the routing topology due to a power outage event when making traffic control decisions.

Network Traffic Control During Limited Power Situations

The techniques herein provide a mechanism whereby traffic selection is dynamically activated as the DAG reforms upon power failure and/or as nodes progressively lost connectivity, to prioritize traffic and meet a guaranteed service level agreement (SLA) for critical traffic sent through the network. In a first aspect, information regarding traffic criticality may be gathered at a policy engine regarding nodes that may be subject to receiving higher volumes of traffic and experience limited lifetimes during power outage events. In another aspect, nodes may monitor the level of congestion of their shared links and/or their respective backup power supplies, to dynamically determine whether any shared traffic should be regulated. In some cases, this may even entail routing certain types of traffic differently during the power outage event.

Illustratively, the techniques described herein may be performed by hardware, software, and/or firmware, such as in accordance with the "network traffic control" process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, according to various embodiments, a device in a network detects a power outage event. The device monitors one or more operational properties of the device, in response to detecting the power outage event. The device determines whether to initiate a traffic control mechanism based on the one or more monitored operational properties of the device, according to a power outage traffic control policy. The device causes one or more nodes in the network that send traffic to the device to regulate the traffic sent to the device, in response to a determination that the traffic control mechanism should be initiated.

Figure 5A:
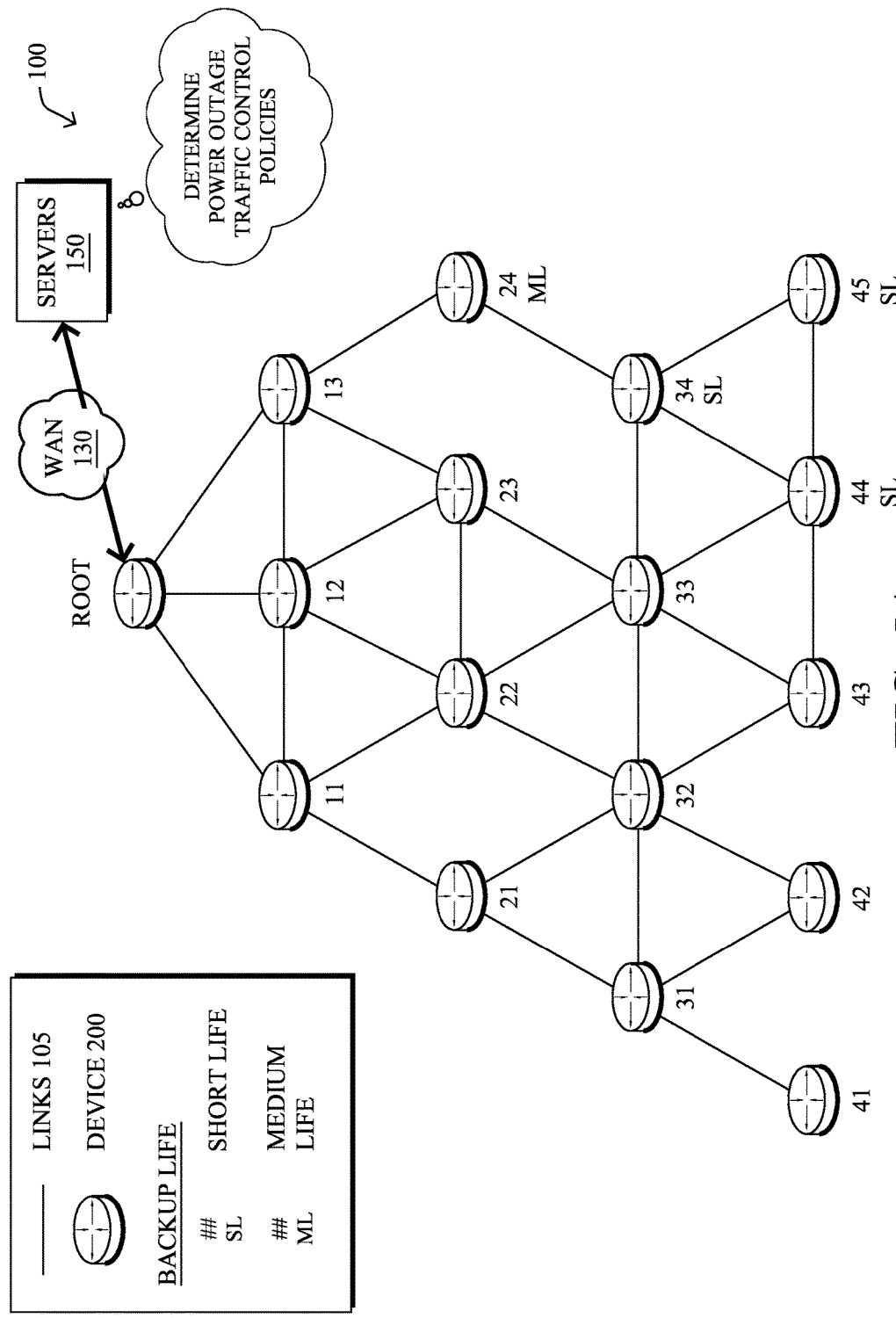
FIGS. 5A-5C illustrate an example of devices/nodes receiving power outage traffic control policies.
Figure 5B:
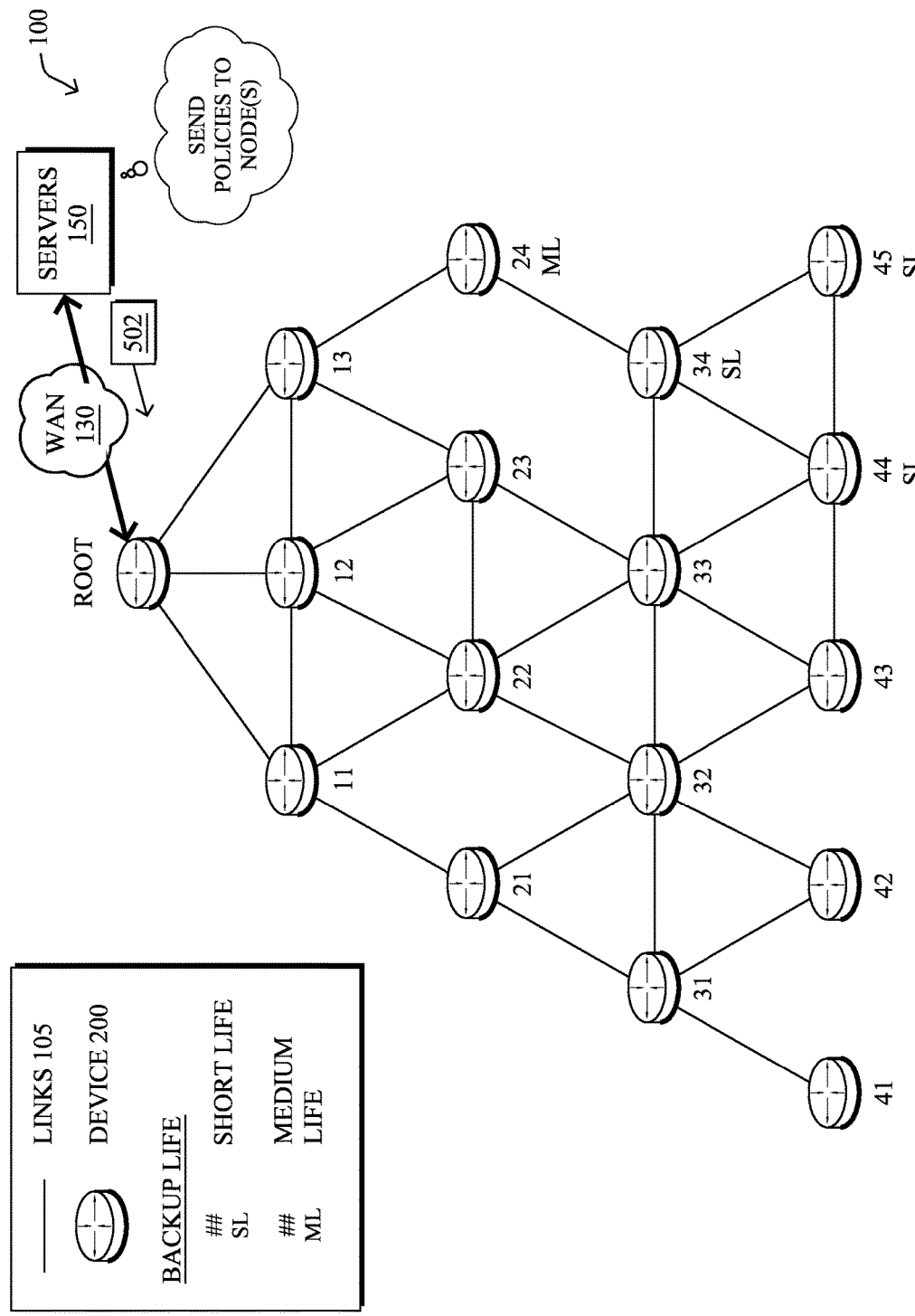
Figure 5C:
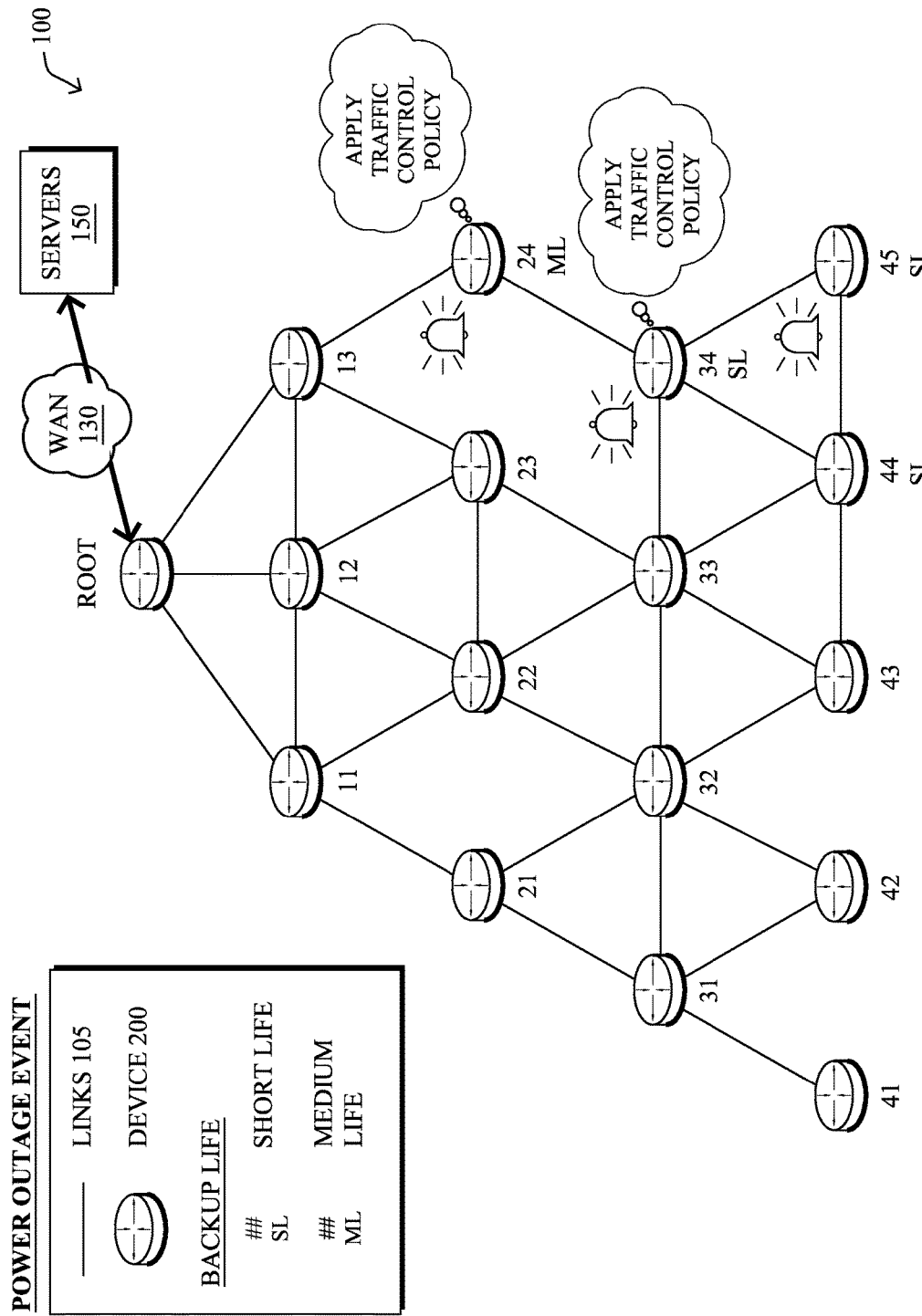

Referring now to FIGS. 5A-5C, an example of devices/nodes receiving power outage traffic control policies is shown, according to various embodiments. As noted above, the various nodes/devices 200 may have varying backup power capabilities. For example, some of nodes/devices 200 may be equipped with ultra-capacitors that provide backup power for only a very limited amount of time. Conversely, other nodes/devices 200 may be equipped with BBUs, allowing these devices to continue operating for minutes or even hours after experiencing a power outage of their primary power sources. In further cases, a node may not even have a backup power supply at all.

For purposes of illustration only, assume that the nodes/devices in a network fall into one of three categories: short lived (SL) nodes, medium lived (ML) nodes, or long lived (LL) nodes. In general, SL nodes have extremely limited auxiliary/backup power sources, in comparison to ML nodes. For example, an SL node may have a lifetime after a power failure of only a few dozen seconds (e.g., Smart Meters), whereas an ML node may have a lifetime after power failure of up to several hours (e.g., range extenders or DA gateways equipped with BBUs). For example, as shown in FIG. 5A, assume that nodes 34 and 44-45 are SL nodes, whereas node 24 is an ML node.

In some cases, a third category of long lived (LL) nodes may also be considered. Such nodes may, for example, correspond to those nodes that remain unaffected by the power outage. Accordingly, an LL device that does not lose power during a power outage event may be viewed as having an unlimited backup lifespan during the event, regardless of the actual backup power capabilities of the devices. Thus, after a short time into a power outage event, the network may be reduced to including only ML and LL devices (e.g., after the SL devices fail). If the power outage persists, the network may be further reduced to including only those LL devices (e.g., after the ML devices fail). As would be appreciated, any number of categories may be used to differentiate the devices based on their backup capabilities.

As pointed out above, upon power failure, SL nodes may have a very limited lifetime (e.g., up to a few dozen seconds) during which they may send critical traffic. For example, an SL node may send a power outage notification (PON) to an OMS (e.g., one of server 150), in response to detecting a power outage at the node. During this time, ML nodes may receive traffic from a variety of nodes. For example, an ML node may receive spikes in critical traffic (e.g., PONs, etc.) from its children nodes affected by the power outage and regular traffic (e.g., ordinary traffic which may include normally sent critical traffic) from its children nodes that are not affected by the power outage.

A first aspect of the techniques herein specifies a policy mechanism that allows each device to receive policy rules indicative of the level of criticality of various applications. For example, as shown in FIG. 5B, a policy engine in servers 150 may determine and send power outage traffic control policies 502 to the various nodes in the network, in case of power failure. In one embodiment, the policy engine may send policies 502 in response to receiving a request from a particular node that lists the various types of traffic/applications flowing through the node. In other embodiments, the policy engine may determine and send policies 502 to the nodes based on their respective backup power capabilities (e.g., SL nodes receive different policies than ML nodes, etc.). For example, policies 502 may be sent via a custom CoAP message that lists a set of applications and their corresponding levels of criticality in case of power outage.

In general, power outage traffic control policies 502 may define a set of rules used by a node to control the corresponding traffic flows that it receives during a power outage. In various embodiments, power outage traffic control policies 502 may take into account the traffic type (e.g., PONs, etc.), the address/identity of the sender (e.g., the policy engine may indicate that traffic from certain nodes is more critical than others), the amount of remaining lifetime/backup capacity the device has left before losing power, and/or the amount of congestion experienced by the node.

As shown in FIG. 5C, assume that nodes 24, 34, and 44-45 experience a power outage event. In such a case, these nodes may apply the respective power outage traffic control policies 502 received from the policy engine, to make traffic control decisions while experiencing power loss. For example, a power outage traffic control policy sent to an SL node (e.g., node 34) may instruct the node to only accept highly critical traffic (e.g., PONs, etc.). In contrast, a power outage traffic control policy send to an ML node (e.g., node 24) may instruct the node to accept distributed automation (DA) traffic reporting major water leaks, high radio-activity alerts, PONs, and/or power quality report traffic, if its BBU capacity is greater than 80%. If its BBU capacity is between 50% and 80%, the ML node may then only accept DA traffic, high radio-activity alerts, and PONs, etc.

Figure 6A:
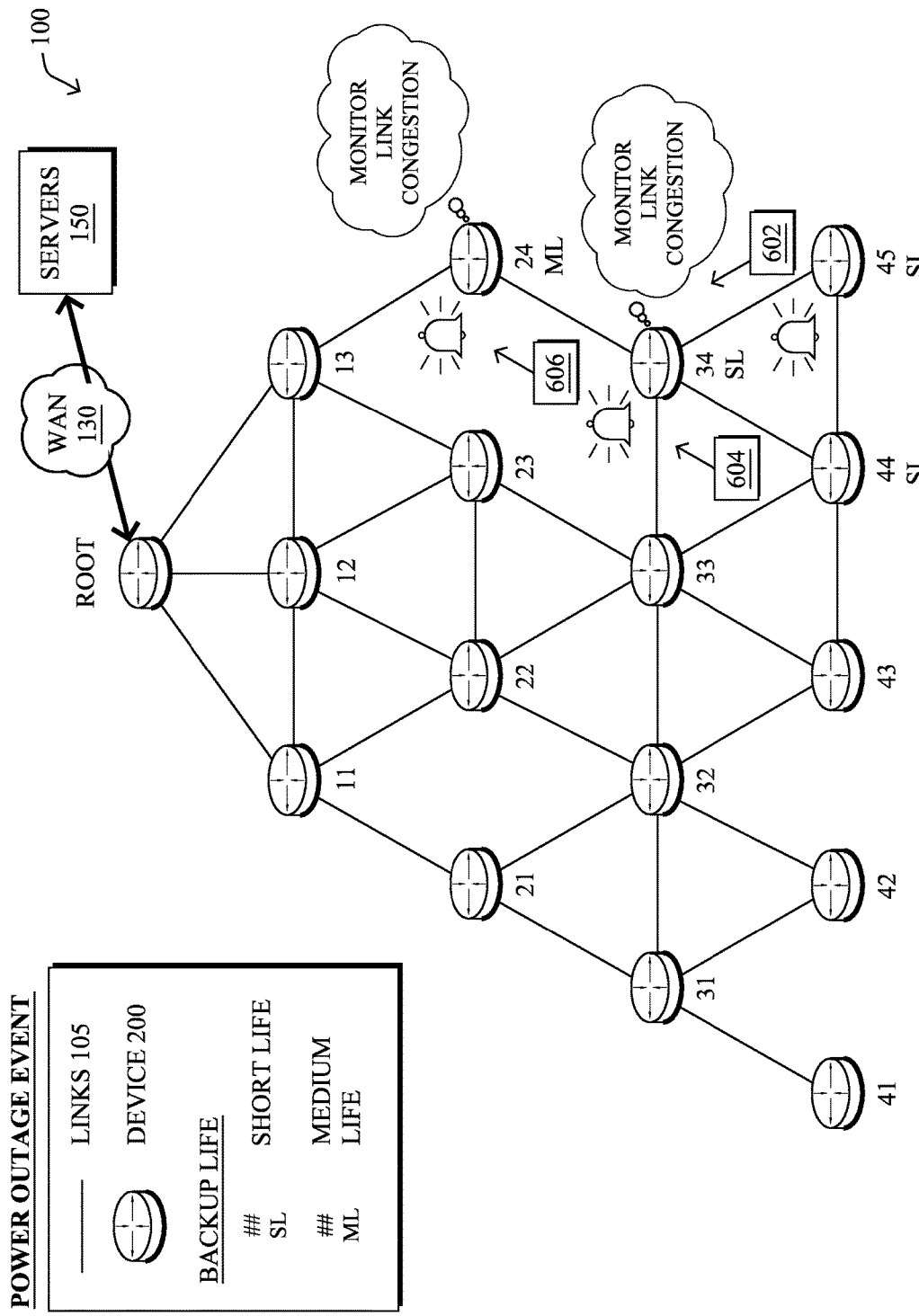
FIGS. 6A-6C illustrate examples of devices/nodes implementing power outage traffic control policies.
Figure 6B:
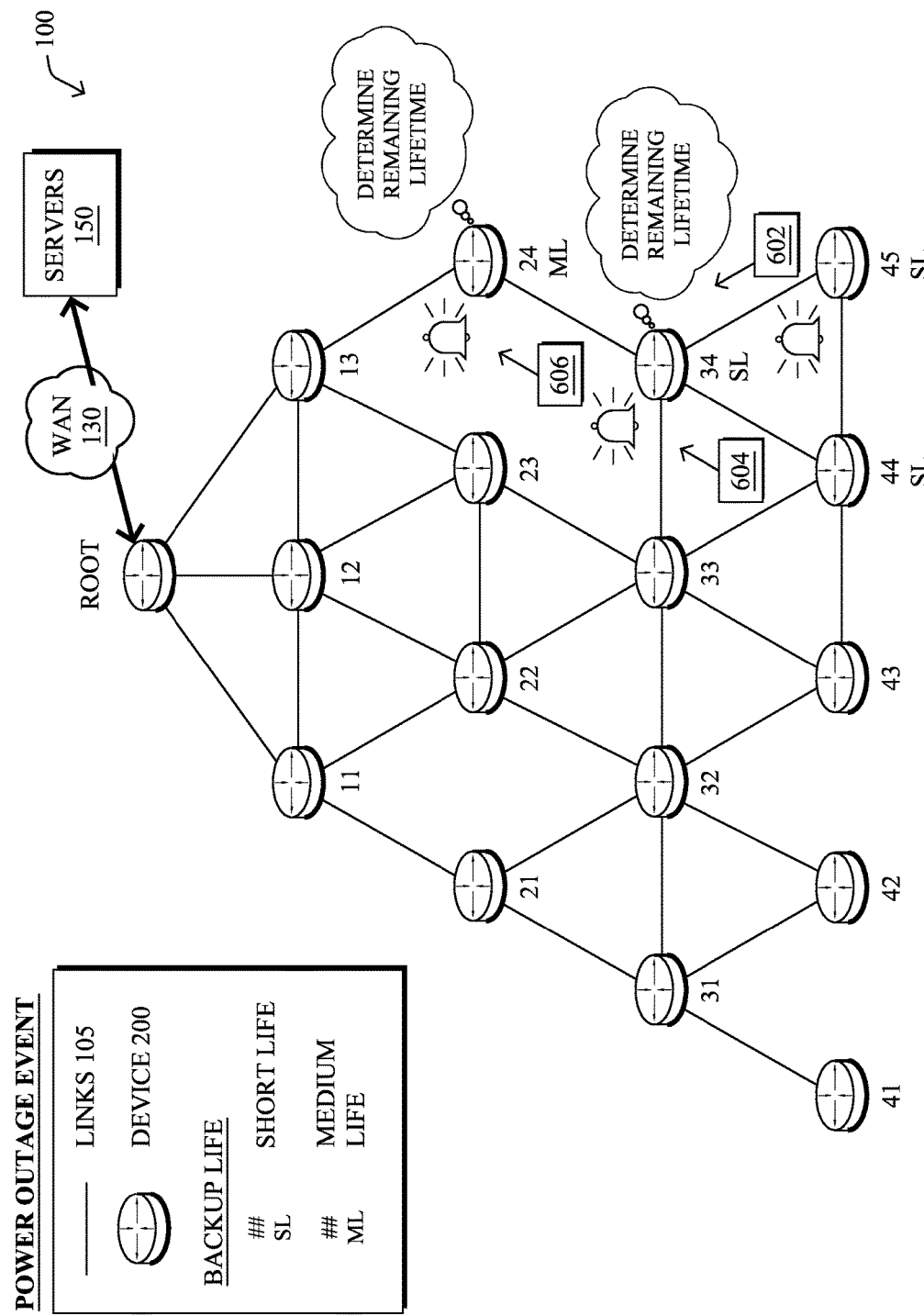
Figure 6C:
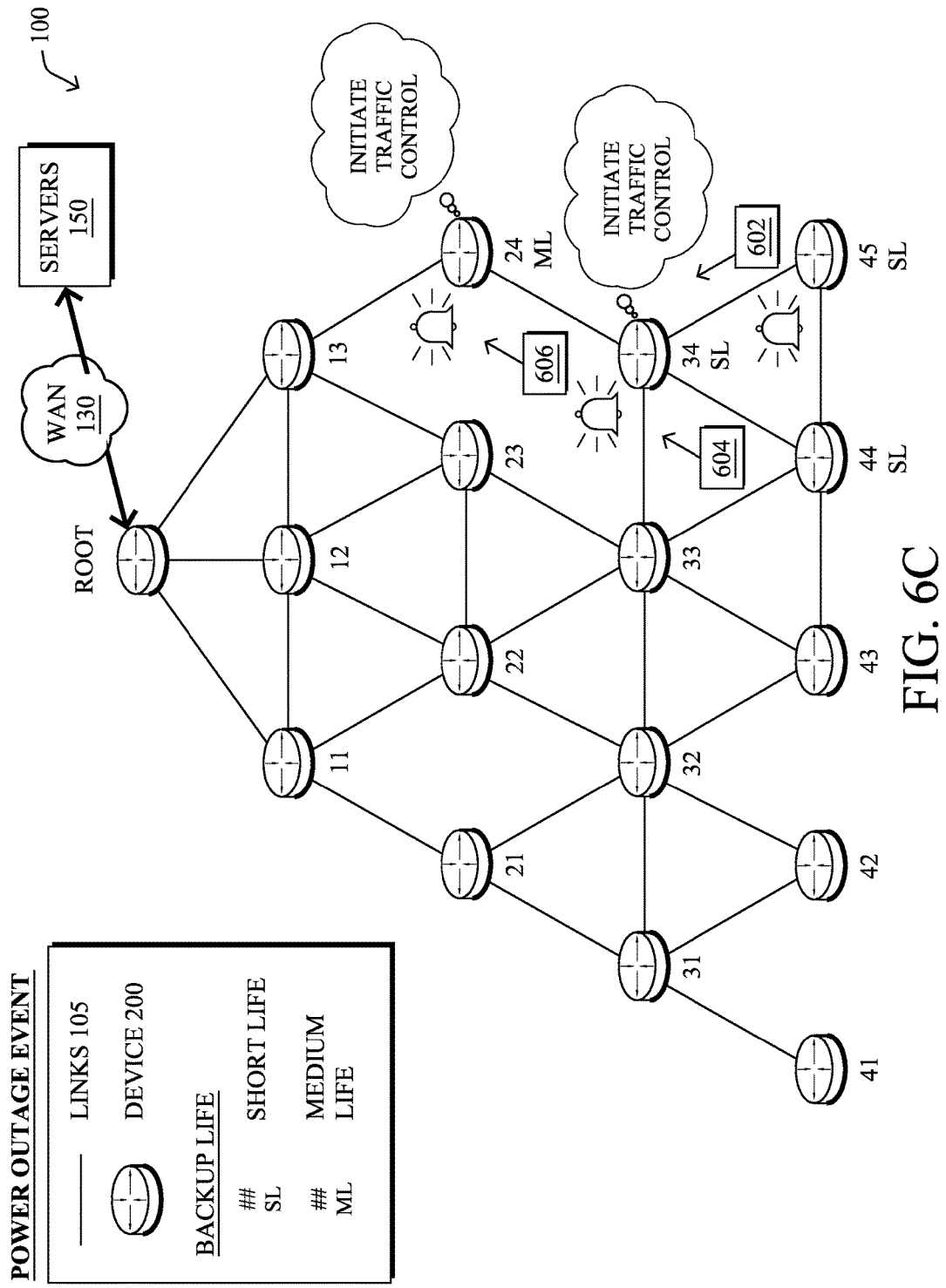

FIGS. 6A-6C illustrate examples of devices/nodes implementing power outage traffic control policies, according to various embodiments. In particular, a new mode of operation is introduced herein that may be used by SL and ML nodes, in response to detecting/experiencing a power outage event (e.g., when the nodes switch over to their auxiliary/backup power sources). While in this mode, the node may monitor one or more of its operational properties, to determine whether a traffic control mechanism should be initiated, in accordance with its power outage traffic control policy.

In one embodiment, a node/device experiencing a power outage may monitor its link congestion. For example, as shown in FIG. 6A, nodes 24 and 34 may monitor their respective amounts of link congestion following the power outage event, to determine the capacity of their respective links 105. In particular, node 34 may monitor the traffic 602 that it receives from node 45 and the traffic 604 that it receives from node 44, to determine the amount of congestion experienced by node 34. Similarly, node 24 may monitor traffic 606 received from node 34, to determine the amount of congestion that it experiences across its link to node 34. In some embodiment, a device may monitor its link congestion based on its number of received packets, the rate of packet collisions, its packet queue depth, etc. Capacity of the link may be determined based on the amount of traffic the node can receive or the amount of traffic the node can forward.

During a power outage, any given node may experience different traffic conditions than under normal conditions. For example, during a power outage, SL nodes may start sending a number of critical messages (e.g., PONs, etc.), while other nodes may send messages to register their states with the NMS, prior to dying. Depending on the topology and number of nodes affected by the power outage, a particular ML node may not see any change in terms of its traffic during the power outage. Conversely, another ML node may start receiving a large number of messages following the start of a power outage. In other words, the amount of link congestion experienced by any given node may or may not change, as a result of a power outage.

In further embodiments, another operational property of a device experiencing a power outage may correspond to the remaining lifetime of the device before it loses power, assuming that power is not restored to the device in time. For example, as shown in FIG. 6B, nodes 24, 34, etc. may determine their respective lifetimes before finally losing power during the power outage. This may be quantified as a percentage or amount of remaining backup/auxiliary power at the device, an amount of time before the device is expected to lose power, or the like. For example, in an ML node, this property may correspond to the remaining capacity of the node's BBU. In another example, an SL node may quantify its remaining lifetime in terms of the number of remaining seconds that its backup capacitor can support before the device loses power completely.

A device may determine whether to initiate a traffic control mechanism based on its measured operational properties and according to its received power outage traffic control policy. For example, as shown in FIG. 6C, nodes 24, 34, etc., may initiate a traffic control mechanism, based on their respective operational properties and power outage traffic control properties. In general, a traffic control mechanism causes one or more nodes that send traffic to a particular device to regulate the types and/or amount of traffic that they send to the device.

In some cases, an SL or ML device may use its measured link congestion to determine whether it is receiving more traffic due to the power outage. If the device detects a spike of traffic (e.g., leading to collisions in non-broadcast, multi-access links such as RF IEEE 802.15.4 or PLC P1901.2 links), the device may determine that the traffic control mechanism should be initiated, to give a higher priority to critical traffic (e.g., PONs, etc.), in accordance with its power outage traffic control policy.

In further cases, a node may initiate a traffic control mechanism based on its remaining backup lifespan. For example, if the backup battery capacity of the node is greater than 90%, the node may decide to not activate the traffic control mechanism and continue to accept all traffic, if its link congestion is not a limiting factor. On the other hand, even if the node can still handle all traffic, but the link is congested, the node may determine that the traffic control mechanism should be initiated. In other words, the node may decide to initiate the traffic control mechanism if the amount of link congestion is above a threshold amount, if the remaining lifetime/backup power capacity is below a threshold amount, or both.

A node may also be operable to disable the traffic control mechanism based on its traffic control policy and its measured operational properties. For example, if the link congestion measured by the device drops below a threshold amount, the device may disable the traffic control mechanism. In another example, if the device is equipped with an energy harvesting power source (e.g., a solar panel, a line clamp, etc.), the device may be able to recharge its backup power supply (e.g., BBU, etc.) above a threshold amount and, accordingly, disable the traffic control mechanism, according to the policy.

Figure 7A:
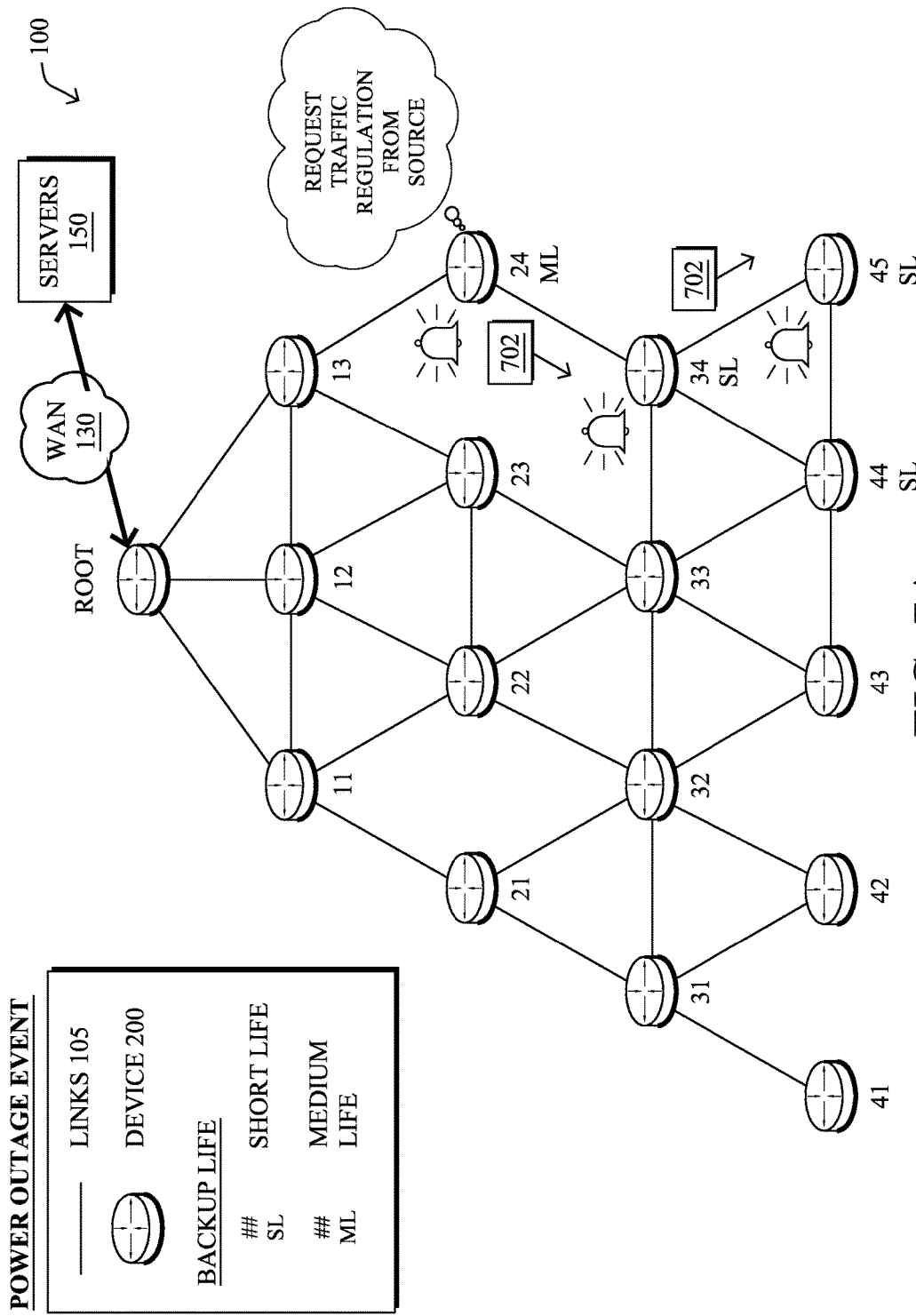
FIGS. 7A-7C illustrate examples of a traffic control mechanism.
Figure 7B:
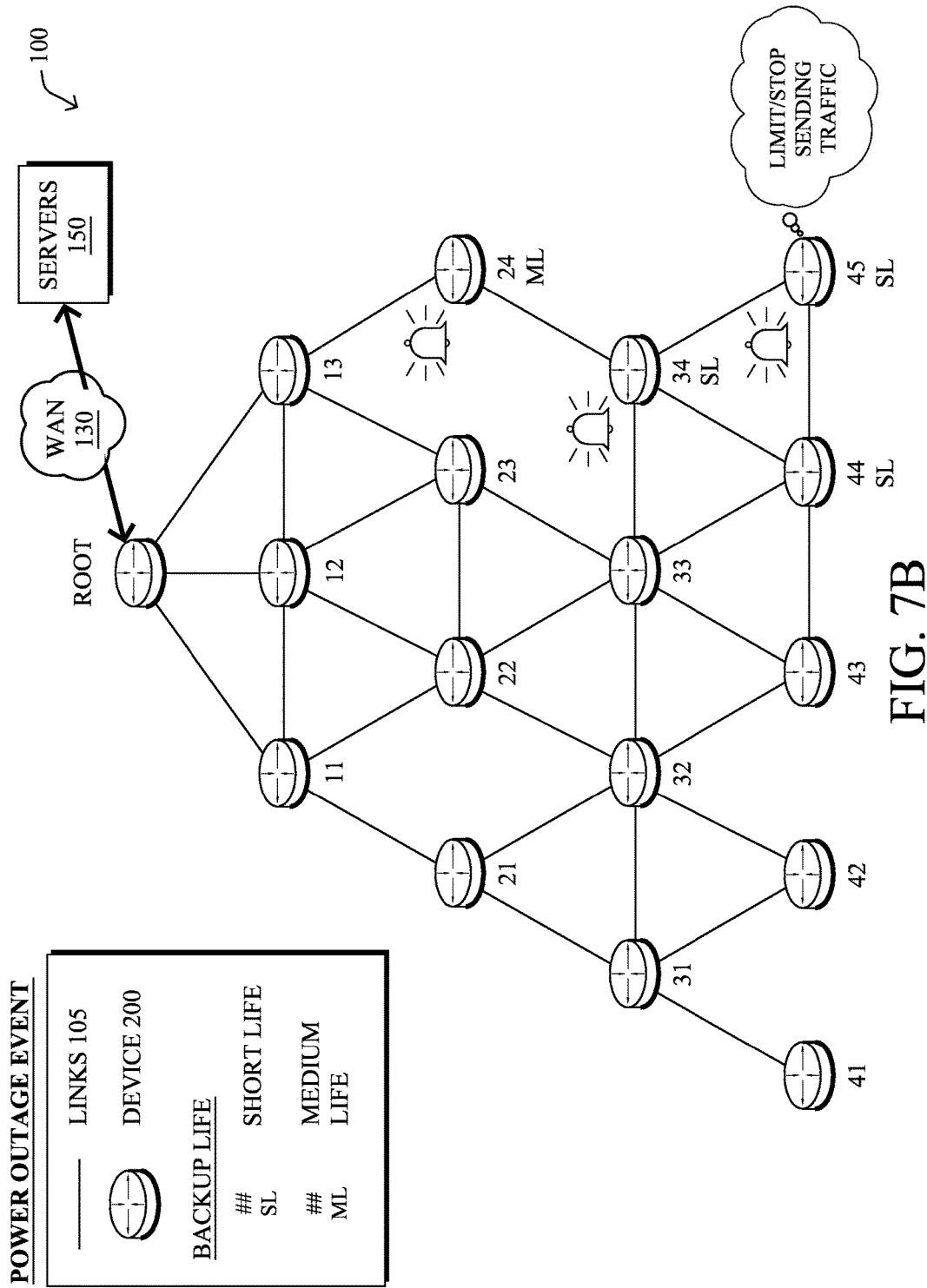
Figure 7C:
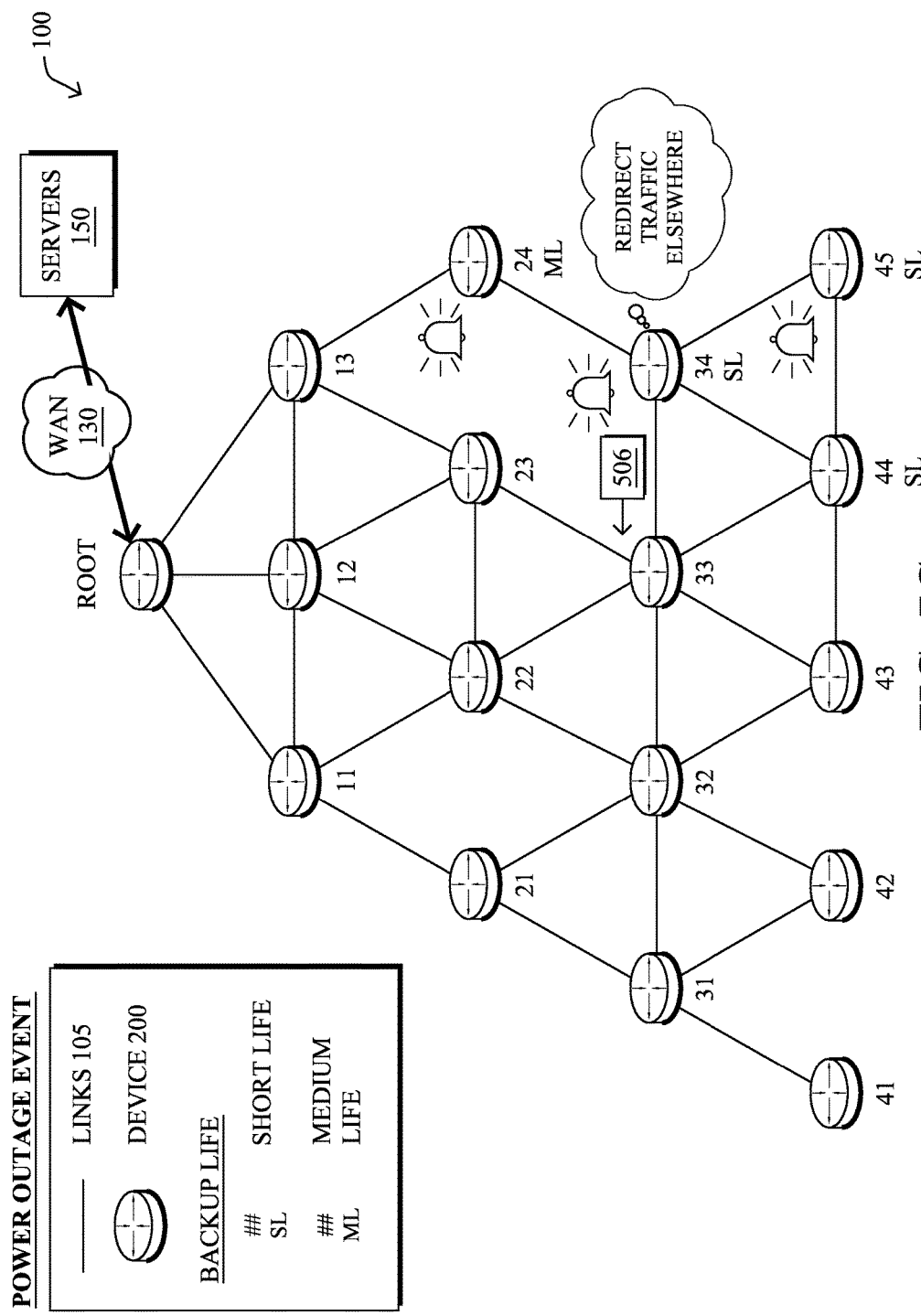

FIGS. 7A-7C illustrate examples of a traffic control mechanism, according to various embodiments. In general, the traffic control mechanism allows a particular node/device to request that one or more nodes that send traffic to the device to regulate the traffic. For example, a particular device may request that one or more nodes stop sending traffic of a certain type to the device during the power outage event. Such a mechanism may be governed by the operational properties of the requesting device (e.g., the link congestion experienced by the device, the remaining lifetime of the device, etc.), in various embodiments.

In one embodiment, a device initiating the traffic control mechanism may send a custom request message to one or more nodes, to request that the nodes regulate their traffic (e.g., by taking a traffic control action). For example, as shown in FIG. 7A, assume that node 24 determines that it should initiate the traffic control mechanism (e.g., based on its traffic control policy, its link congestion, remaining lifetime before losing power, etc.). In such a case, node 24 may send a custom message 702 to one or more of the nodes that send traffic to node 24. Generally, message 702 may request that a receiving node take a traffic control action, to regulate the traffic that the receiving device sends to node 24. For example, message 702 may request that a receiving node begin shaping its traffic rate (e.g., by adjusting the rate at which it sends the traffic) or stop sending the traffic altogether.

In response to receiving a traffic control request, a node may implement the requested traffic control action. For example, as shown in FIG. 7B, node 45 may rate limit traffic of a certain type that it sends to node 24 during the power outage event. Alternatively, node 45 may simply stop sending the type of traffic altogether, in response to receiving message 702.

In various embodiments, an indicated traffic control action may be associated with a particular type of traffic. Thus, a receiving node may take one type of control action with respect to a certain type of traffic and a different type of control action with respect to a different type of traffic. For example, a node may request to a subset or all of it neighbors sending traffic to apply traffic shaping for moderately critical traffic, while allowing all highly critical traffic to be sent normally, and to stop sending all non-critical traffic. Notably, the requesting node may determine the traffic type(s), traffic control action(s), and/or the triggering conditions based on the power outage traffic control policy it received from the policy engine.

Message 702 may be of any number of different forms, according to various embodiments. For example, message 702 may be an IEEE 802.15.4e Information Element, a newly specified link local multicast IPv6 message, or a unicast IPv6 message sent to the nodes sending traffic (or to a subset of the nodes sending the highest volume of traffic).

Depending on the power outage traffic control policy, a device may cause adjustments to be made to how a node regulates the traffic sent to the device. For example, the device may send a first message requesting that the node simply rate limit its non-critical traffic, if the device's backup lifespan is above a threshold amount. However, if the power outage persists and the lifespan drops below the threshold, the device may send a second request message to the node that subsequently requests that the node stop sending all traffic except for highly critical traffic.

In yet another embodiment, a device may suggest that the one or more nodes redirect traffic to other devices, as a potential traffic control action. For example, as shown in FIG. 7C, node 34 may start sending traffic 506 to node 33 instead of to node 24, in response to receiving a message 702 from node 24. For example, RFC6551 metrics may be specified that would allow a node to use its remaining battery level as a routing metric. In such a case, the routing metric (or constraint) may be extended to support application-specific routing. For example, the node may increase that metric for traffic of specific types, thus discouraging other node from send non-critical traffic to it.

Figure 8:
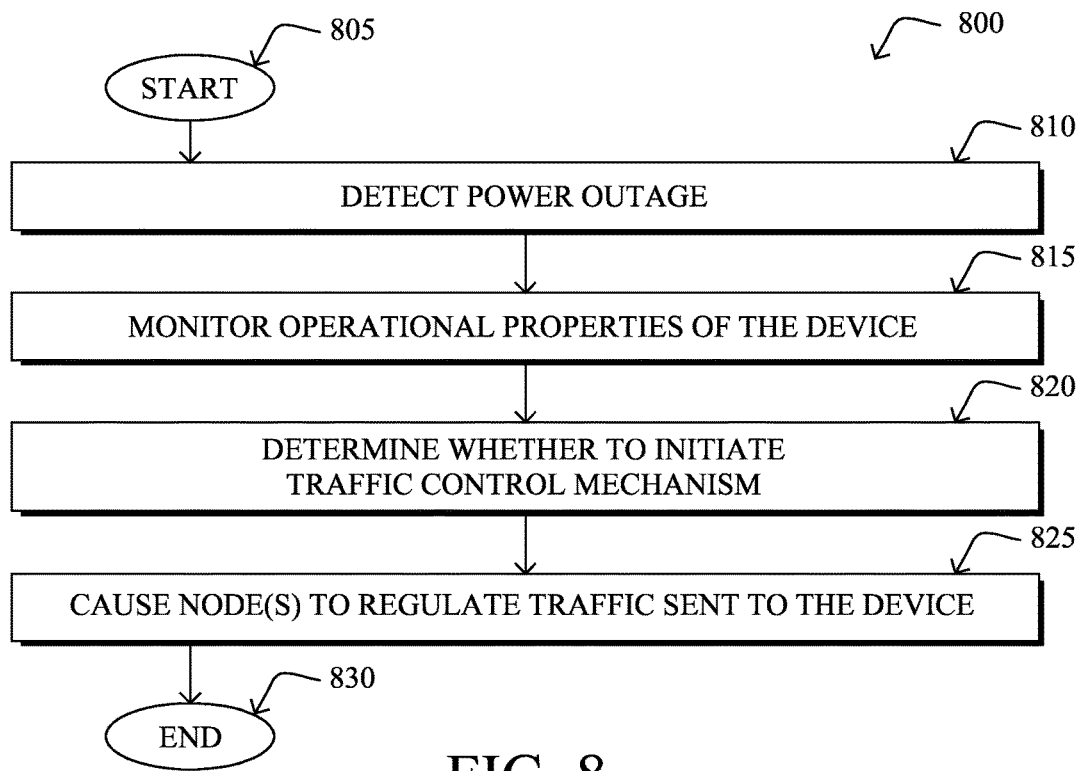
FIG. 8 illustrates an example simplified procedure for causing traffic sent to a device to be regulated during a power outage event.

FIG. 8 illustrates an example simplified procedure for causing traffic sent to a device to be regulated during a power outage event, according to various embodiments described herein. Procedure 800 may begin at step 805 and continue on to step 810 where, as described in greater detail above, a device in a network may detect a power outage event. For example, the device may determine that it has stopped receiving power from its primary power source (e.g., a power line, etc.). In general, procedure 800 may be performed by a node/device (e.g., device 200) in the network that has a secondary power source (e.g., capacitor, BBU, etc.) and experiences a power outage event.

At step 815, the device may monitor one or more operational properties of the device, in response to detecting the power outage event. In various embodiments, the one or more operational properties may include, but are not limited to, an amount of link congestion, a determined amount of link capacity of the device, an amount of remaining lifetime of the device before the device loses backup power, combinations thereof, or the like. For example, the device may determine the amount of link congestion based on a monitored number of received packets, a rate of packet collisions, or a depth of a packet transmission queue of the device. Similarly, the device may determine the amount of link capacity based on the amount of traffic that it can receive and/or transmit. In general, the amount of remaining lifetime of the device before the device loses backup power may be quantified in terms of an amount of time before the device is expected to lose power altogether, an amount of remaining power in a backup/auxiliary power source (e.g., a percentage of full capacity, etc.), or the like.

At step 820, the device determines whether to initiate a traffic control mechanism, as described in greater detail above. In various embodiments, the determination may be based on the one or more measured operational properties of the device, in accordance with a power outage traffic control policy. For example, the device may receive a power outage traffic control policy from a supervisory device (e.g., a policy engine) and use the policy to determine when to initiate traffic control during a power outage based on its monitored operational properties. In another embodiment, the determination may be based in part on the type of backup power source used by the device (e.g., whether the device is being powered by a capacitor or battery, etc.).

In some embodiments, the policy may apply to a particular type of traffic, traffic having a certain level of criticality, traffic from a particular node or type of node, etc. Additionally, the policy may also indicate a traffic control action that should be requested, as part of the traffic control mechanism. For example, such an action may correspond to shaping/rate limiting the traffic, stopping the traffic from being sent, and/or sending the traffic along a different routing path. The policy may also include varying threshold such that different actions are requested under different circumstances.

At step 825, the device causes one or more devices that send traffic to the device to regulate their traffic, in response to a determination that the traffic control mechanism should be initiated. In particular, the one or more nodes may regulate their traffic by taking a specified traffic control action (e.g., rate limiting the traffic, stop sending the traffic, redirecting the traffic, etc.). As would be appreciated, the device may cause the one or more nodes to adjust how the traffic is regulated, in some cases. For example, the device may request that a node rate limit its non-critical traffic, if the device's backup lifetime is above a first threshold and later request that the node only send highly critical traffic, if the device's backup lifetime falls below another threshold. In further cases, the device may also request that the one or more node stop regulating the traffic (e.g., after power is restored). Procedure 800 then ends at step 830.

Figure 9:
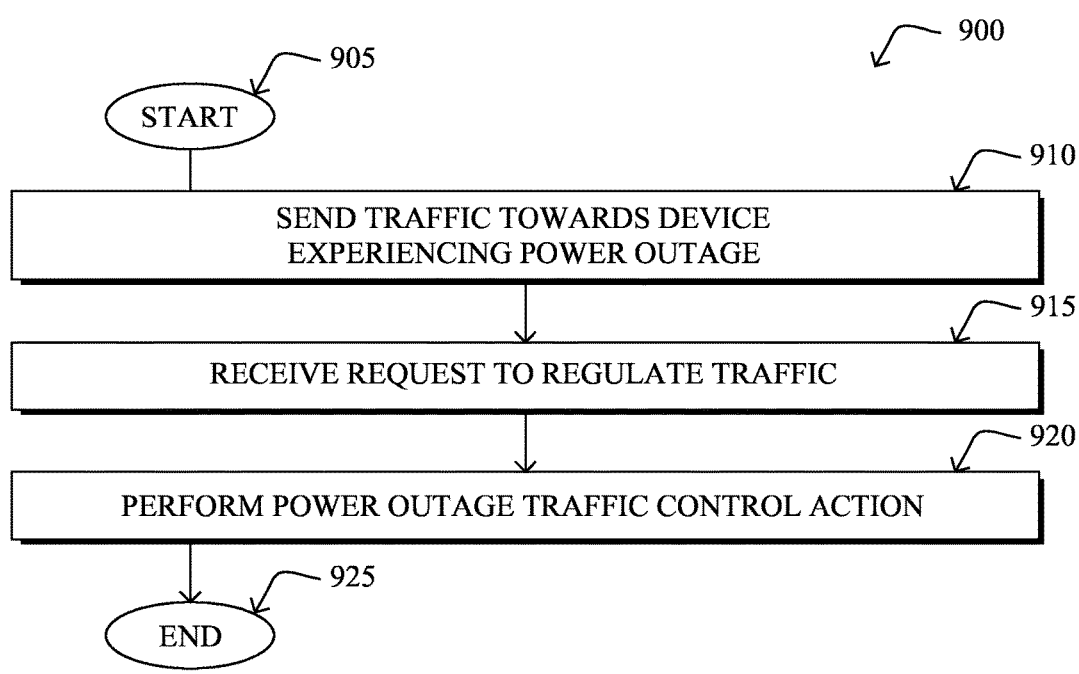
FIG. 9 illustrates an example simplified procedure for regulating traffic sent to a device experiencing a power outage event.

FIG. 9 illustrates an example simplified procedure for regulating traffic sent to a device experiencing a power outage event. Procedure 900 may begin at step 905 and continue on to step 910 where, as described in greater detail above, a first device in a network sends traffic towards a second device in the network that is experiencing a power outage event. In some cases, the first device may also be experiencing the power outage event or, alternatively, may be unaffected by the power outage event.

At step 915, as detailed above, the first device may receive a request to regulate its traffic that it sends to the second device. In particular, the second device may initiate a power outage traffic control mechanism through which the traffic that it receives may be regulated. For example, the second device may request that the first device regulate its traffic according to the criticality of the traffic. In some embodiments, the request may indicate a particular traffic control action that the first device should perform, to regulate the traffic. For example, the second device may request that the first device rate limit a certain type of traffic, stop sending traffic of that type altogether, or send the traffic via another routing path that does not include the second device.

At step 920, the first device may perform a power outage traffic control action, as described in greater detail above. In various cases, the action may be performed with respect to all traffic sent by the first device to the second device or based on the type/criticality of the traffic to be sent. For example, the first device may rate limit one type of traffic that it sends to the second device, while leaving a different type of traffic unaffected. Procedure 900 then ends at step 925.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for network traffic control during limited power situations. In particular, the techniques herein protect critical traffic in case of power outage in IoT networks, taking advantage of the heterogeneous nature of the nodes, thus dramatically increasing the SLA of critical importance.

While there have been shown and described illustrative embodiments that provide for network traffic control during limited power situations, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a device in a network, a power outage event;
   monitoring, by the device, one or more operational properties of the device, in response to detecting the power outage event;
   determining, by the device, whether to initiate a traffic control mechanism based on the one or more monitored operational properties of the device, according to a power outage traffic control policy; and
   causing, by the device, one or more nodes in the network that send traffic to the device to regulate the traffic sent to the device, in response to a determination that the traffic control mechanism should be initiated.

2. The method as in claim 1, wherein the one or more nodes regulate the traffic sent to the device by performing an action comprising at least one of: stopping the traffic from being sent, shaping a rate of the traffic, or redirecting the traffic to another device.

3. The method as in claim 2, wherein the power outage traffic control policy specifies the action based on a level of criticality of the traffic.

4. The method as in claim 2, wherein the power outage traffic control policy specifies the action based on a type of traffic or an identified sender of the traffic.

5. The method as in claim 2, wherein the device causes the one or more nodes to redirect the traffic to another device by adjusting one or more metrics advertised by the device in a routing protocol message.

6. The method as in claim 1, wherein the one or more monitored operational properties of the device comprise at least one of: link congestion at the device, link capacity of the device, or a remaining lifetime of the device before losing backup power.

7. The method as in claim 6, wherein the remaining lifetime of the device before losing backup power comprises a percentage of full backup power remaining or an estimated time until power loss.

8. The method as in claim 6, wherein the link capacity is based on an amount of traffic the device can receive or transmit.

9. The method as in claim 6, wherein the link congestion is based on at least one of: a monitored number of received packets, a rate of packet collisions, or a depth of a packet transmission queue of the device.

10. The method as in claim 1, further comprising:
receiving, at the device, the power outage traffic control policy from a supervisory device.

11. The method as in claim 1, wherein the determination that the traffic control mechanism should be initiated is based in part on whether the device receives backup power from a capacitor or a battery.

12. The method as in claim 1, wherein the determination that the traffic control mechanism should be initiated is based in part on a determination that link congestion at the device after the power outage event exceeds a congestion threshold.

13. The method as in claim 1, wherein the determination that the traffic control mechanism should be initiated is based on a determination that a remaining lifetime of the device before losing power is below a lifetime threshold.

14. The method as in claim 13, wherein the determination that the traffic control mechanism should be initiated is based first on a determination that link congestion at the device after the power outage event exceeds a congestion threshold and, if so, is based further on the determination that the remaining lifetime of the device before losing power is below the lifetime threshold.

15. The method as in claim 1, further comprising:
causing, by the device, the one or more nodes to adjust how the traffic sent to the device is regulated, in response to a determination that the one or more operational properties of the device have changed.

16. The method as in claim 1, further comprising:
causing, by the device, the one or more nodes to stop regulating the traffic sent to the device, in response to a determination that the one or more operational properties of the device have changed.

17. An apparatus, comprising:
one or more network interfaces to communicate with a network;
a processor coupled to the one or more network interfaces and configured to execute a process; and
a memory configured to store the process executable by the processor, the process when executed operable to:
detect a power outage event;
monitor one or more operational properties of the apparatus, in response to detecting the power outage event;
determine whether to initiate a traffic control mechanism based on the one or more monitored operational properties of the apparatus, according to a power outage traffic control policy; and
cause one or more nodes in the network that send traffic to the apparatus to regulate the traffic sent to the apparatus, in response to a determination that the traffic control mechanism should be initiated.

18. The apparatus as in claim 17, wherein the one or more nodes regulate the traffic sent to the apparatus by performing an action comprising at least one of: stopping the traffic from being sent, shaping a rate of the traffic, or redirecting the traffic to another device.

19. The apparatus as in claim 18, wherein the power outage traffic control policy specifies the action based on a level of criticality of the traffic.

20. The apparatus as in claim 17, wherein the determination that the traffic control mechanism should be initiated is based in part on whether the apparatus receives backup power from a capacitor or a battery.

21. The apparatus as in claim 17, wherein the determination that the traffic control mechanism should be initiated is based first on a determination that link congestion at the apparatus after the power outage event exceeds a congestion threshold and, if so, is based further on the determination that a remaining lifetime of the apparatus before losing power is below a lifetime threshold.

22. The apparatus as in claim 17, wherein the process when executed is further operable to:
cause the one or more nodes to adjust how the traffic sent to the apparatus is regulated, in response to a determination that the one or more operational properties of the apparatus have changed.

* * * * *